United States Patent

[11] 3,562,586

| [72] | Inventors | William A. Carter<br>Devon;<br>Otto Jensen, Malvern, Pa. |
|---|---|---|
| [21] | Appl. No. | 776,097 |
| [22] | Filed | Nov. 15, 1968 |
| [45] | Patented | Feb. 9, 1971 |
| [73] | Assignee | I-T-E Imperial Corporation<br>Philadelphia, Pa.<br>a corporation of Delaware |

[54] THERMAL ANALOGUE PROTECTION FOR CAPACITORS
5 Claims, 4 Drawing Figs.

[52] U.S. Cl. .................................................. 317/12,
317/13, 317/40
[51] Int. Cl. ..................................................... H02h 7/16
[50] Field of Search .......................................... 317/12, 40,
31; 337/102, 104; 324/104; 317/12.1, 12.5, 40.1, 13

[56] References Cited
UNITED STATES PATENTS
| 2,756,391 | 7/1956 | Petzinger ..................... | 324/104 |
| 2,849,660 | 8/1958 | Gygax ......................... | 317/29 |

OTHER REFERENCES
Rider, J. F. and Prensky, S. D. HOW TO USE METERS N.Y. John F. Rider Publisher, page 69

*Primary Examiner*—James D. Trammell
*Assistant Examiner*—Ulysses Weldon
*Attorney*—Ostrolenk, Faber, Gerb & Soffen ABSTRACT: A capacitor protection system is provided having the primary winding of a potential transformer connected across a series capacitor bank to be protected and the secondary winding of the potential transformer connected to a thermal analog device which reproduces the thermal characteristics of the capacitor and operates capacitor switching means when dangerous thermal conditions are reached. An inverse time voltage relay is also connected across the secondary winding to initiate protective capacitor switching responsive to high current faults. The thermal analogue device simulates the internal thermal conditions of the capacitor based on the principle that the power loss in the capacitor is proportional to the square of the voltage across the capacitor. Voltage comparison circuits are also provided between groups of capacitors in banks having multiple groups to detect blown fuses associated with respective capacitor groups.

INVENTORS
WILLIAM A. CARTER
OTTO JENSEN

BY

OSTROLENK, FABER, GERB & SOFFEN
ATTORNEYS

THERMAL ANALOGUE PROTECTION FOR CAPACITORS

BACKGROUND OF THE INVENTION

This invention relates to electrical protection systems and is more particularly concerned with the provision of sensing systems for monitoring the voltage and thermal conditions existing within an electrical component and especially within a capacitor. The sensing system is connected to a protective switching system which responds to signals from the sensing system upon the occurrence of predetermined conditions conditions within the electrical component to switch the electrical component out of the circuit and thereby prevent its damage.

Electrical systems include components and groups of components which are subject to damage caused by excessive voltage or excessive internal temperature. In many situations, it has been found desirable to provide these components or groups of components with protective systems to eliminate such damage. It has been found particularly desirable to use such protective systems in power transmission lines for the protection of the series capacitor bank in the transmission lines.

The use of series capacitor banks in alternating current power transmission lines is well known.

Since the capacitor banks constitute a constant reactance, the voltage drop appearing across such capacitor banks will be directly proportional to the load current. Therefore a nonprotected series capacitor bank is subjected to an increased voltage drop during the occurrence of various types of fault conditions on the line. Although capacitor units which form the capacitor bank are capable of withstanding overloads for brief periods of time, they will be subjected to serious damage should the line current and voltage across the capacitors exceed their rated value by an excessive amount for a short period of time (as would occur during a short circuit condition) or the voltage even moderately exceeds their rated value for an extended period of time (as would occur during moderate overload or when one or more fuses of parallel capacitors have blown).

The volume and price of a capacitor generally increases with the square of its maximum current rating. It is therefore, undesirable to use series capacitors rated greatly in excess of normal line current. Accordingly, it has become the practice to use a bank of capacitors rated for normal load conditions and to provide a protective arrangement which will quickly protect the capacitor bank as by taking it out of the transmission line or short circuiting the bank upon the occurrence of various predetermined circuit conditions.

For example, 25 percent to 50 percent more than rated voltage will produce eventual capacitor damage resulting from excessive internal temperature in a given time, depending on ambient temperature. That is, the capacitor could safely withstand a given overload during winter temperatures whereas the same overload would damage the capacitor in the summer.

The series capacitors of power transmission lines must also be protected against high over-voltages existing for short periods of time. For example over-voltages exceeding over 200 percent of the rated value of the capacitor can cause capacitor damage resulting from ionization of the dielectric due to corona discharge.

The present invention is directed to a novel monitoring circuit for operating a protective switching system in accordance with the internal thermal conditions of the capacitor under overload conditions and in accordance with the instantaneous voltage across the capacitor under high current fault conditions.

Previous monitor systems used for capacitor protection employ conventional current transformers for monitoring the current load conditions of the line. The output of the current transformer is connected to appropriate overcurrent and time measuring relays, such that, if the time-current condition exceeds some predetermined relationship, the measuring relays are operated to actuate protection switching and remove the entire group of capacitors from the circuit.

The use of line current monitoring suffers several disadvantages. For instance, the series capacitor banks include a number of capacitors connected in parallel. Usually each parallel branch of the capacitor arrangement includes a fuse. If the fuse in one of the branches blows, there will be an increase in reactance of the group and an increase in the voltage drop across the remaining capacitors. Furthermore, the current through each of the remaining capacitors will increase proportionately since the line current will remain the same. Since the current transformer will only indicate the line current, it will not detect the blown fuse condition and the capacitors remaining in the line will be subject to damage caused by over-voltage and excessive internal temperature.

Another disadvantage of current sensing systems is that such sensing systems do not take into account the external environmental conditions. As mentioned before, during cold weather the capacitors may be safely operated at current levels above their ratings since the heat generated internally is quickly removed by the external environmental conditions. Therefore, during such cold weather, it will be safe to leave the series capacitor banks in the line for a longer time, and with a given overload than in the summer. Since the current transformer measurement monitors only the current and does not adjust for the external temperature, the capacitor banks may be prematurely and undesirably removed from the line.

A further problem involved in the use of current measurement techniques in sensing systems is that such sensing systems must actuate current relays. The use of such relays to match a voltage-time characteristic results in a complex combination of overcurrent and time relays or results in a compromise in the eventual over-voltage protection characteristic curve. Furthermore, over-voltage conditions may exist when the line current is low but the capacitors may be damaged due to corona discharge. Under such conditions, the current transformer or other current measurement technique will not protect the capacitor bank from the over-voltage.

The present invention provides a sensing system for use in protection systems for electrical components and particularly capacitors which overcome the above and other disadvantages of presently existing sensing systems. In one preferred embodiment of the instant invention, the primary winding of a potential transformer is connected across the terminals of one, or a group of parallel capacitors. The potential transformer monitors the voltage of the group rather than the current. The secondary winding of the potential transformer is connected to a thermal analogue device which simulates the internal thermal conditions of the capacitor. This simulation is based upon the principle that the power generated within an actual capacitor varies directly with the square of the voltage applied under constant current conditions. The thermal analogue device also takes into account the eternal environmental conditions which determine the heat dissipation of the capacitor. The thermal analogue device includes a set of contacts which operate at the maximum temperature which the capacitor can tolerate to cause the operation of the protective switch to remove the voltage from the capacitor. Also connected across the secondary winding of the potential transformer is an inverse time-voltage relay. The inverse time-voltage relay acts to remove the capacitor group from service before corona damage occurs under fault voltage conditions and before the thermal protection device has a chance to operate.

The sensing system of the instant invention also includes, in a second embodiment thereof for use in banks of capacitors having multiple groups of capacitors, means for the detection of blown fuses. In this second embodiment, isolating transformers are connected to the secondary windings of the potential transformer across each group of capacitors. The secondary voltages of the isolating transformers are then compared in a relay circuit to cause the energization of the relay which is associated with a group of capacitors having a blown fuse, if there are any blown fuses. In this second embodiment having multigroup banks a current transformer in the main line may have a current relay and thermal analogue device connected to its secondary terminals. This combination of current transformer relay and analogue device are located at platform potential and make possible the communication of information to ground potential. The relay is an undercurrent relay used to initiate bypassing of the capacitor bank at line currents below a preselected current. The thermal analogue device represents the entire capacitor bank and acts to transmit a warning signal to ground when the entire bank nears its thermal limit. The analogue device can also act to bypass the entire bank if the maximum permissible temperature is reached.

It is, therefore, one object of the instant invention to provide a sensing system for protection systems for capacitors and other electrical components capable of sensing the voltage across such components and thereby protect them from over-voltage conditions.

Another object of the instant invention is to provide a sensing system for series capacitors including a potential transformer thermal analogue device and inverse time-voltage relay for protecting the series capacitor from excess internal temperature and corona damage caused by over-voltage.

It is a further object of the instant invention to employ a thermal analogue device connected to the potential transformer whereby the internal temperature condition of the capacitor may be simulated taking into account all ambient conditions such as ambient temperature, solar radiation, etc., and the capacitor may be protected against excessive internal temperature making full use of the capacitor before it actually reaches its maximum thermal limit.

Another object of the instant invention is to provide a sensing system for a capacitor protection system whereby the capacitor may be protected against corona damage by the use of an inverse time-voltage relay rather than the more expensive circuitry involved when current relays must be employed.

It is another object of the instant invention to provide a sensing system for groups of parallel capacitors whereby the capacitor group is not removed from the line upon the blowing of the fuse in any of the parallel branches unless the value of the line current is such as to produce a dangerous over-voltage.

Another object of the instant invention is to provide a sensing system for use in series capacitor banks having multigroup of capacitors capable of indicating the blowing of the fuse in any particular group of capacitors without removing the group or the entire bank from the line circuit.

It is a further object of the instant invention to provide a sensing system whereby the potential transformer of the sensing system is connected across each group of capacitors in a series capacitor bank having multigroups of capacitors whereby it is possible to remove the single group of damaged capacitors without removing the other groups of the banks which are not excessively damaged. This permits the partial series compensation of a power transmission line.

It is a further object of the instant invention to provide a current transformer connected to the main line at line or platform potential to provide information at ground level describing the temperature condition of the entire bank of capacitors and also to cause the bypass of the bank of capacitors at low currents.

The above objects, features and advantages of the instant invention along with other objects, features and advantages will become apparent upon a reading of the following description of the preferred embodiments of the instant invention in conjunction with the drawings as follows.

Figure 1:
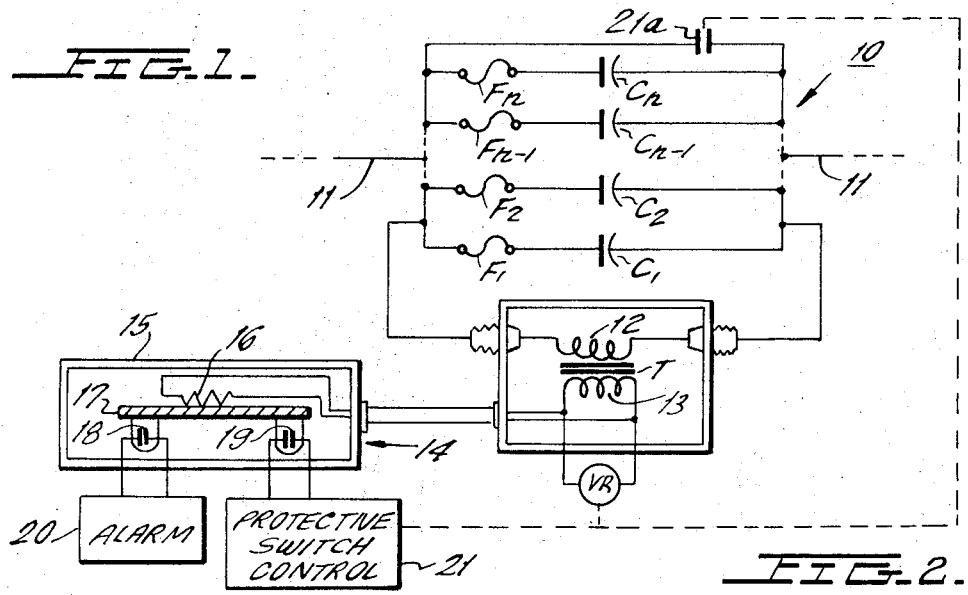
FIG. 1 is a first embodiment of the instant invention of a sensing system connected across a group of capacitors in parallel in a transmission line.

Referring next to the drawings, there is shown in FIG. 1 a single group of capacitors 10 of a series capacitor bank connected in a transmission line 11 of a power transmission system. The group of capacitors contains $n$ capacitors connected in parallel ($C_1$ through $C_n$). Each of the parallel branches contains a fuse ($F_1$ through $F_n$). It is the capacitors $C_1$ through $C_n$ which the protection system must be designed to protect from over-voltages.

As has been mentioned before over-voltages on the capacitors may be caused by any of a number of occurrences. One such occurrence may be the blowing of a fuse in one of the parallel branches of the capacitor group. In particular, if one of the fuses of one of the parallel branches is blown, the capacitor of that branch will be removed from the circuit leaving the remaining capacitors connected in parallel. This will result in an increase in the reactance of the capacitor group. Since the line current is relatively constant as dictated by the load at the end of the line and not the presence or absence of the capacitor bank, the increase in reactance will result in an increase in voltage across the capacitor group and thereby across each of the individual capacitors in the group. Stated another way, since there will now be less branches in the parallel group of capacitors, the current through each group will be greater since the total current will remain constant. The results of the blown fuse will thereby cause an increase in the internal temperature of the capacitors. Furthermore, if enough of the fuses of the group of capacitors has blown, the over-voltage may be great enough to impose danger of corona damage to the capacitors.

In order to protect against the above damages, the sensing system of the instant invention is incorporated. This sensing system includes a potential transformer T having its primary winding 12 connected across the group of capacitors 10. The potential transformer T may be of a high iron content construction and it monitors the voltage across the group of capacitors 10.

The secondary winding 13 of the potential transformer T is connected to the thermal an analogue device 14. The analogue device 14 is based on the principle that the power generated within the actual capacitor varies directly with the square of the applied voltage. The capacitor can be considered to be a container inside of which is placed a thermal mass and a resistor. The surface area of the capacitor case as well as its color and texture results in a particular rate of heat dissipation. Variations in the value of applied voltage will cause the generator to increase or decrease in proportion to the square of the voltage.

The thermal analogue device 14 consists of a small container generally indicated as 15. Inside the container there is a small low energy resistor 16 which is attached to a heat sink 17. The size of the resistor 16 and the heat sink 17 must be physically tailored to match the particular type of capacitor ($C_1$ through $C_n$) which is to be protected. The surface area, color and texture are chosen to produce a rate of heat dissipation which will match that of the actual capacitor.

Device 14 could take many other forms. For example, it could also be another capacitor, similar to capacitors $C_1$ to $C_n$, but reduced in voltage rating by the stepdown ratio of transformer T. A thermocouple can then be buried in the device to give an output related to capacitor temperature which would follow the temperature of capacitors $C_1$ to $C_n$.

Two sets of thermally actuated contacts 18 and 19 are connected to the heat sink 17. These contacts may be either normally opened or closed as desired and are used to operate an alarm 20 and the protective switch control 21. The contacts 18 may be arranged to actuate the alarm 20 when the temperature is below the maximum permissible value which the capacitor can sustain. The contacts 19 are arranged to operate at the maximum temperature which the capacitor can tolerate and will cause the operation of the protective switch control 21 to remove voltage from the capacitor group 10 as by causing the closing of switch 21a connected in parallel with the group. Since the heating and cooling characteristics of the analogue device 14 are designed to match that of the capacitor, the contacts 19 which are used to signal the capacitor reaching its maximum operating temperature are also used to signal the capacitors return to a safe operating temperature.

It should be noted that while the analogue device 14 is electrically at the potential of the transformer case, it is physically removed from the immediate proximity of the transformer T. This done to avoid thermal communication between the transformer T and the analogue device 14.

Also connected to the secondary winding 13 of the potential transformer T is the inverse time-voltage relay VR. The relay VR operates to remove the capacitor group 10 from service before corona damage has occurred to the capacitors of the group. The inverse time-voltage relay VR operates so that the higher the voltage drop across the capacitor, the faster the relay will operate thereby protecting the capacitor. The transformer T must be designed not to saturate at voltages below such voltages as would cause the corona damage in order for the inverse time-voltage relay to be effective and at the same time permit the maximum use of the capacitors. For instance, about 2.5 times the rated voltage of the capacitor group is a realistic tolerable over-voltage which the capacitor should endure for short times during its operating life and, therefore, the transformer T should be designed not to saturate at voltages as high as 2.5 times the rated voltage of the capacitor group.

In operation the sensing system of FIG. 1 serves to protect the group of capacitors 10 by monitoring of the voltage across this group of capacitors. The voltage across the group of capacitors is detected by the potential transformer T. This transformer may step down the voltage which is fed to the analogue device 14 and the inverse time-voltage relay VR. If the voltage is above the rated voltage of the capacitors of group 10, by an amount sufficient to cause corona damage, the relay VR will operate to remove the voltage from the capacitors by either causing a short around the capacitors or by opening the circuit to the capacitors. For instance, the relay VR may be arranged to operate switch 21a which is also operable by protective switch control 21 or it may operate a separate switch. If the voltage is not sufficient to cause corona damage but is above the rated voltage and causes excessive internal temperature in the capacitors, the analogue device 14 will sense this as a result of the simulated conditions within the analogue device 14 and it will cause the operation of an alarm 20 before the maximum permissible temperature is reached and it will cause the operation of the protective switch control 21 when such maximum permissible temperature is reached. The protective switch control 21 then operates switch 21a to remove the voltage from the group of capacitors in the same manner as mentioned for the relay VR.

Figure 2:
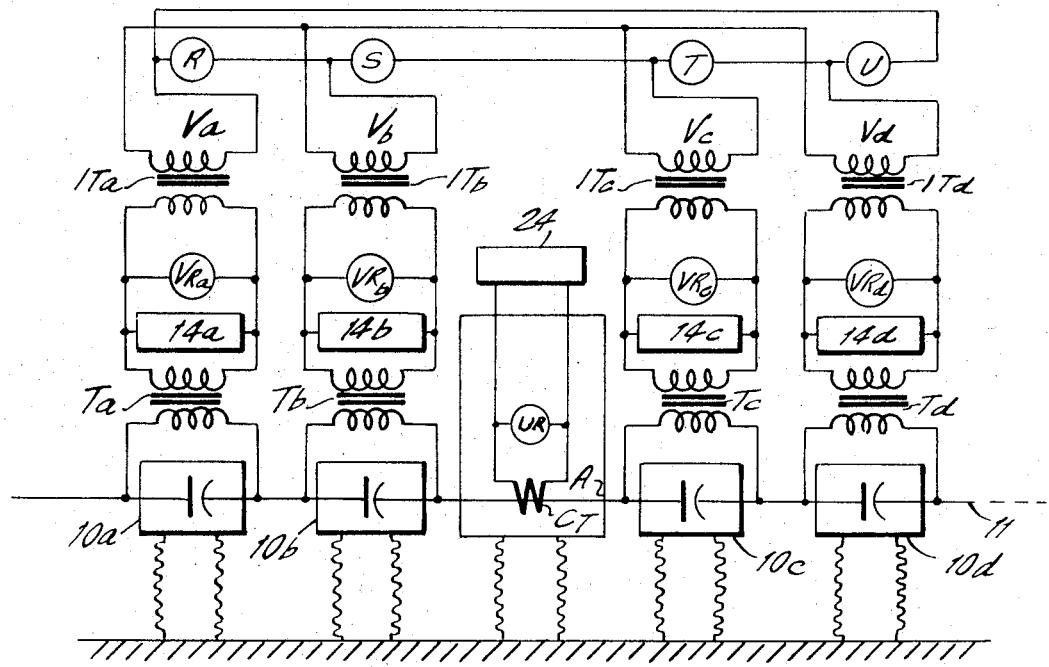
FIG. 2 shows a second embodiment of the instant invention as employed in a bank of series capacitors having multiple groups of capacitors.

The system of FIG. 2 shows a four-group series capacitor bank. Each of the four groups includes a sensing system similar to that shown in FIG. 1. The parts of each of the groups of FIG. 2 have been given reference numerals corresponding to the reference numerals of the corresponding parts of Figure 1. These correspondingly numbered parts operate in the same manner as described with respect to FIG. 1.

Figure 3:
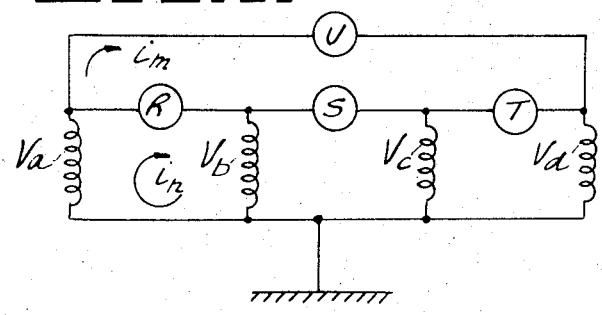
FIG. 3 is the equivalent circuit of the voltage comparison network of FIG. 2 for indicating a blown fuse in any of the groups of capacitors.

In addition to the sensing system of FIG. 1 provided for each group of capacitors (10a through 10d) the multigroup bank of FIG. 2 is provided with a voltage comparison network for detecting the presence of blown fuses in each of the four groups. The voltage comparison circuit includes isolating transformers $IT_a$, $IT_b$, $IT_c$ and $IT_d$ connected to the respective secondary windings of potential transformers $T_a$, $T_b$, $T_c$ and $T_d$ of each of the four groups. One terminal of each of the secondary windings of the isolating transformers is connected to platform potential as shown in FIG. 3. In addition, relays R, S, T and U are connected between successive pairs of the second terminals of the primary windings of each of the isolating transformers. As seen in FIG. 2, each of the capacitor groups is electrically independent of all other groups and, therefore, the isolating transformers must have a one-to-one ratio to reduce the floating potential seen at the secondary winding of each of the potential transformers $T_a$ through $T_d$ to a voltage difference across the secondaries of the isolating transformers with the platform potential serving as a reference. In this manner the secondary voltages of the isolating transformers are compared. It should be noted that the blowing of a fuse in a single group will cause two relays to be operated as to be explained hereinafter, thus creating a signal which can be transmitted to ground by means described in copending U.S. application Ser. No. 699,628 in the name of Otto Jensen, entitles "Signaling System For Transmitting Information Between Points of Different Potential," and assigned to the assignee of the instant invention.

Figure 4:
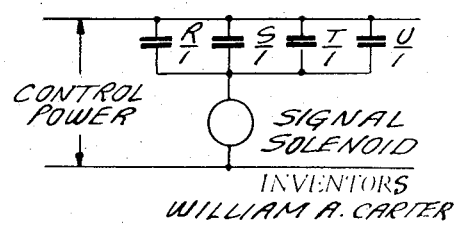
FIG. 4 is a circuit diagram of the signaling arrangement which may be used with the relays of FIG. 2 for indicating blown fuses in the groups of capacitors.

The operation of the comparison circuit may be described as follows. Assuming that a fuse has blown in group 10a, there is an increase in the voltage across the capacitors of this group, as explained previously, since the reactance of the group has increased and the line current has remained the same. This increased voltage is detected by the potential transformer $T_a$ and causes a voltage $V_a$ across the secondary windings of the isolating transformer $IT_a$. The voltage $V_a$ is greater than each of the voltages $V_b$, $V_c$ and $V_d$ if it is assumed that none of the fuses of the group $10_b$, $10_c$ or $10_d$ have blown. The increased voltage $V_a$ causes the flow of current $I_m$ and $I_n$ through relays U and R, respectively. These relays actuate contacts $R_1$ and $U_1$ in the circuit of FIG. 4 to cause the operation of the signaling solenoid. If it is assumed now that a fuse blows in group 10b by the above reasoning, it will be apparent that the voltage $V_b$ will equal the voltage $V_a$. Therefore, the relay R will cease to operate. However, there will now be a voltage difference between the terminals of relay S and a current will be produced causing the operation of relay S. Relay U will continue to operate as previously described. Again it is seen that at least two relays will remain operated to indicate the presence of a blown fuse. By providing for the operation of at least two relays, the reliability of the system in the detection of blown fuses is increased.

Referring again to FIG. 2, there is additionally shown a current transformer CT connected in the main line 11 at point A. Connected to the secondary terminals of the current transformer CT are the undercurrent relays UR and the thermal analogue device 24 of a capacitor. The thermal analogue device 24 is of the same construction as the previously described thermal analogue device 14. This combination of current transformer CT, undercurrent relay UR and thermal analogue device 24 are located at platform potential to make possible the communication of the information to ground potential in the manner described in the above-mentioned copending U.S. application Ser. No. 699,628. The relay UR can be employed to bypass the capacitor bank when the current is below preselected currents and it may reinsert the bank automatically when the current again reaches the preselected minimum value. The thermal analogue device 24 may simulate the entire capacitor bank and may be employed to transmit a warning signal to ground that the entire bank is nearing its thermal limit or it may act to bypass the entire bank if the maximum permissible temperature is reached in the manner previously described with respect to analogue device 14. If an alarm signal is transmitted provisions may be made whereby a load dispatcher may adjust the load current to a safe lower value.

From the above description, it can be seen that a sensing system has been provided for a protective system for series capacitors. The sensing system protects these capacitors from excessive internal temperature and from excessive over-voltages which may cause corona damage. The system employs an inexpensive thermal analogue device which simulates the internal conditions of the capacitor taking into account external environmental conditions, thereby permitting the maximum use of the capacitor. The system further employs a potential transformer and potential sensing means making possible the detection of blown fuses and making the use of inverse time-voltage relays possible to detect over-voltage conditions.

While the instant invention has been described with respect to several preferred embodiments, thereof, many modifications and variations will now become apparent to those skilled in the art. For instance, the sensing system of the instant invention may be employed with electrical components other than series capacitors. It is, therefore, preferred that the scope of the instant invention not be limited by the foregoing description herein but rather by the appended claims.

We claim:

1. In an electrical component protection system for protecting an electrical component from damage caused by excessive voltage applied to said electrical component, the combination comprising:

protective switching means connected to said component for switching said component out of said system in response to the application of a predetermined excessive voltage applied thereto;

electrical sensing means connected to said protective switching means and responsive to the voltage applied to said electrical component for operating said protective switching means to switch out said component when said voltage reaches said predetermined value;

said electrical sensing means comprising;

voltage sensing means connected across said electrical component and producing an output voltage representative of the voltage across said electrical component;

thermal analogue means including a heater means, a thermal mass means adjacent said heater means, and a thermal switch means adjacent said thermal mass means and operably responsive to the temperature of said thermal mass means, means connecting said produced output voltage of said voltage sensing means to said thermal analogue heater means to generate heat thereat for activating said thermal switch means upon the connection to said heater means of a voltage corresponding to that which would damage said electrical component;

means connecting said thermal switch means to said protective switching means for activating said protective switching means upon activation of said thermal switch means; and said thermal mass means having thermal characteristics which simulate the thermal characteristics of said electrical component whereby said thermal switch means operates said protective switching means upon the occurrence of a given thermal condition in said thermal mass which is comparable to that which would cause damage when existent in said electrical component.

2. The combination of claim 1 wherein said electrical sensing means further includes relay means having an input circuit connected to receive the output voltage produced by said voltage sensing means and an output circuit connected to said protective switching means; said relay means comprising an inverse time-voltage responsive device whereby said relay means output circuit actuates said protective switching means in response to the occurence of output voltages from said voltage sensing means which exceed a particular value within a time period which is progressively shorter as the magnitude of said output voltage progressively increases above said particular value.

3. The combination of claim 1 wherein said electrical component being protected is a capacitor and said voltage sensing means includes a potential transformer having its primary winding connected across said capacitor and its secondary winding connected to said thermal analogue means.

4. The combination of claim 2, wherein said voltage sensing means is a potential transformer having its primary winding connected across said electrical component and having its secondary winding connected to said relay means input circuit and to said heater means.

5. The combination of claim 2 wherein said electrical component being protected is a capacitor and wherein said inverse time-voltage responsive device is an inverse time-voltage relay which protects said capacitor from corona damage caused by the application of excessive voltage across said capacitor.